UNITED STATES PATENT OFFICE.

HENRY DOSE, OF NEW ATHENS, ILLINOIS.

VETERINARY REMEDY.

SPECIFICATION forming part of Letters Patent No. 393,424, dated November 27, 1888.

Application filed September 18, 1888. Serial No. 285,711. (No specimens.)

*To all whom it may concern:*

Be it known that I, HENRY DOSE, a citizen of the United States, residing at New Athens, in the county of St. Clair and State of Illinois, have invented a new and useful combination of remedies to be used as a veterinary remedy for diseases of our larger domestic animals, and especially the disease (commonly called "milk" or "calving fever") of milch cows, of which the following is a specification.

My combination consists of the following ingredients, combined in the proportion stated, viz: Bromide of potassium, eight ounces; fluid extract of ergot, one and one-half fluid ounce; fluid extract of cimicifuga, two fluid ounces; tincture of nux-vomica, two fluid ounces; tincture of gelsemium, one and one-half fluid ounce; tincture of belladonna, six fluid drams; tincture of aconite, (root,) four fluid drams; sulphuric ether, two fluid ounces; pure water, a sufficient quantity to make one pint. All of these remedies are of the quality and strength as prescribed in the Dispensatory of the United States, edition of the year 1883.

In using the above-named combination it should be diluted with enough pure water to make the whole quantity one quart, of which four fluid ounces should be given to a cow or horse every one and one-half hour.

I am not aware that all of the ingredients of my combination in the proportions stated have been used together.

What I claim, and desire to secure by Letters Patent of the United States, is—

The herein-described combination of remedies to be used for diseases of our larger domestic animals, and especially the disease commonly called "milk-fever," consisting of bromide of potassium, (or another compound of bromine of similar effect,) ergot, cimicifuga, nux-vomica, gelsemium, belladonna, aconite, sulphuric ether, and water, in the proportions specified.

HENRY DOSE.

Witnesses:
PETER HAUPT,
AUGUST GIERSCHNER.